United States Patent [19]

Hildinger, deceased

[11] 4,434,471
[45] Feb. 28, 1984

[54] TEXT PROCESSING DEVICE

[75] Inventor: Eugen Hildinger, deceased, late of Soecking, Fed. Rep. of Germany, by Marianne Hildinger, heir

[73] Assignee: Siemens Aktiengesellschaft, Berlin & Munich, Fed. Rep. of Germany

[21] Appl. No.: 60,418

[22] Filed: Jul. 25, 1979

[30] Foreign Application Priority Data

Aug. 31, 1978 [DE] Fed. Rep. of Germany ....... 2838063

[51] Int. Cl.$^3$ ............................................. G06F 13/04
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,516,068 | 6/1970 | Howard et al. | 364/900 |
| 3,798,605 | 3/1974 | Feistel | 364/200 |
| 3,806,882 | 4/1974 | Clarke | 364/200 |
| 4,041,467 | 8/1977 | Cota et al. | 364/900 |
| 4,087,856 | 5/1978 | Attanasio | 364/200 |
| 4,128,874 | 12/1978 | Pertl et al. | 364/200 |

Primary Examiner—Gareth D. Shaw
Assistant Examiner—John G. Mills
Attorney, Agent, or Firm—Hill, Van Santen, Steadman, Chiara & Simpson

[57] ABSTRACT

A text processing device which includes a typewriter and a memory device, in which a comparison circuit is provided, by means of which a write/read connection between the memory device and the typewriter is completed as a function of the positive result of a comparison between a stored identification and an identification input by means of the typewriter keyboard, for the protection of stored text information against changes and unauthorized access by third parties.

2 Claims, 1 Drawing Figure

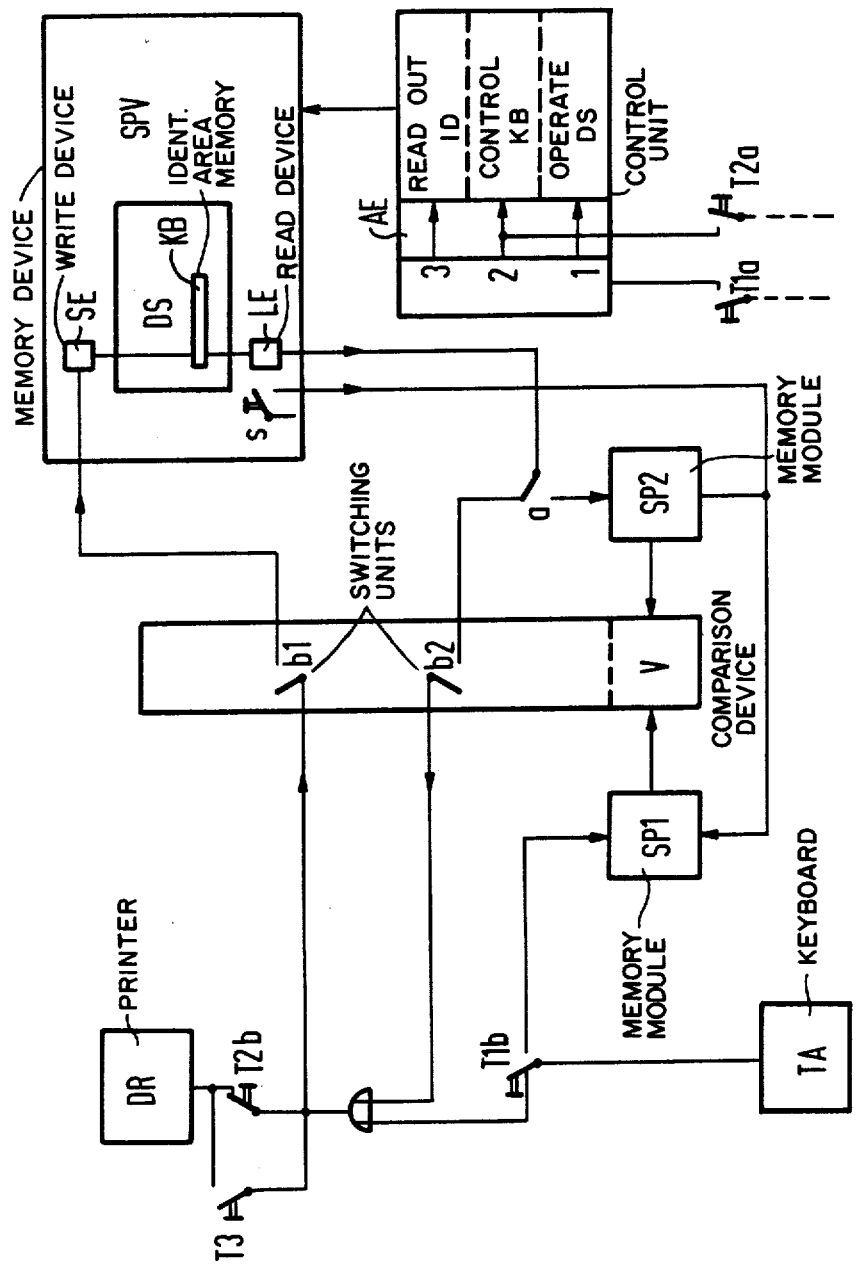

TEXT PROCESSING DEVICE

BACKGROUND OF THE INVENTION

The invention relates to a text processing device for employment with a typewriter having a memory device in which the information input by means of the typewriter keyboard is storable and may be re-worked, and which, as needed, controls a data output device, for example the printing device of the typewriter, in correspondence to the stored information.

In typewriters expanded to form text processing devices, storage devices are employed into which the information is initially input and subsequently or repeatedly read-out for reworking or transcribing. For such purposes, storage means are available, particularly electronic memories, but also magnetic storage media, as for example magnetic tape or magnetic disc memories. Any desired information can be input into such memories or input information can be changed as may be desired. The memory content is then available for output means of the typewriter. An example of such type of text-processing device is illustrated in my U.S. Pat. No. 4,130,884.

By means of so-called search criteria, which are to be input over the keyboard of the typewriter, it has become known to locate the specific text locations within the inscribed memory in order to effect a change in the memory content or in order to read out the memory content commencing from such location. The employment of search criteria for locating such text locations represents an alternative measure to further known addressing possibilities.

The known text processing devices offer very little protection against unauthorized interrogation or more particularly against unauthorized manipulation, i.e. changes in the stored information. Consequently, even in a device which is properly functioning, great care must be employed in the comparison of the original, desired text with the final clean copy in order to be able to exclude errors from an intentional, unauthorized manipulation of the memory content.

Proceeding from these concepts, the invention has among its objects the production of a text processing device which will provide the greatest possible protection of the stored information. It will be appreciated that only authorized operating personnel should be in a position to interrogate or to change correspondingly safeguarded information.

A text processing device which fulfills these requirements, in accordance with the invention, utilizes a comparison device which is connected with the memory device by switching units controllable by means of the comparison device for effecting completion of the connections between the memory device and the text processing typewriter, in the presence of coincidence of identification data received from the data memory with identification data supplied over the keyboard, and a control unit for the memory device for finding and evaluating a memory area in the data memory selectively containing the identification data.

In a next processing device constructed in accordance with the present invention, the connections between the typewriter and the memory device are initially open operatively disconnected by means of suitable circuit-technical measures. As a result, a connection of the two units cannot be directly effected by an operator. The switching unit for completing the connections between the memory device and the text-processing typewriter are controllable in the present invention only by means of the comparison device, i.e. only when identification data is input by the operator, over the keyboard of the typewriter, which corresponds to the identification data supplied to the comparison device from the memory.

The control unit for the memory device, provided in accordance with the invention, serves to locate the memory location containing the respective identification data involved. Since the two units are separated from one another until the presence of a positive comparison result between the identification data supplied by the text-processing typewriter and that supplied by the memory device, it is likewise impossible to remove the stored identification from the data memory. If a basic identification, which imposes no limitation in the access to the data memory, is stored in the memory area of the memory device, provided for the identification, the comparison device completes a connection between a memory device and the text-processing typewriter without any kind of identification input over the keyboard.

According to a preferred embodiment of the invention, the switching unit provided in the text processing device is controllable by the read unit of the memory device, as a function of the scanning position in the data memory, which switches the output of the read unit from the data output device over to the comparison device upon existence of the identification area in the data memory. By so doing, it is guaranteed that only the information residing in the identification area of the data memory is supplied to the comparison device. The remaining data memory content, on the other hand, cannot be supplied to the comparison device.

Preferably, two memory modules are preconnected to the comparison device, one of which receives the identification data from the data memory, and the other of which receives the identification data supplied by the keyboard. Upon termination of the read-out of the stored informational content or reworking thereof, such memory modules are erased.

In accordance with a further preferred embodiment of the invention, the text processing device thereof is provided with a manually actuatable switch unit for the further operation of the control unit for locating an identification area and for switching off the data output device. By means of these additional elements, it is possible to input a new identification at the identification area provided therefor without this identification having an external effect by being printed out. Thus, only the person inputting the information is in a position to affect the data memory so safeguarded. However, if it is desired to also indicate the identification, contained in the memory data, on the original written draft, the text processing device is additionally provided with a hand-actuatable bridging switch disposed in parallel to the switching section of the manual actuatable switch unit which disconnects the data output device.

BRIEF DESCRIPTION OF THE DRAWING

The FIGURE of the drawing is a schematic circuit diagram, in block form, illustrating the component units required for an understanding of the invention.

DETAILED DESCRIPTION OF THE INVENTION

The basic component parts of the typewriter, forming a part of the text-processing device, comprise a keyboard TA and printer DR. A memory device SPV having a data memory DS is provided for the storage of the information adapted to be input over the keyboard TA. In addition, the memory device SPV includes a write device SE and a read device LE for the data memory DS, which can be coupled with the functional connection circuit between the keyboard TA and the printer DR of the typewriter, over switching units b1 and b2.

The switching units b1 and b2 are activated to closed condition when the comparison device V supplies a corresponding control signal, which is generated by the comparison circuit when identical identification data is supplied at the inputs of the comparison circuit V, by means of the memory modules SP1 and SP2. The memory module SP1 is allocated to the keyboard TA and receives data therefrom, while the memory module SP2 is allocated to and receives data from the memory device SPV.

The data memory DS contains an identification area KB, the content of which must be transferred into the memory module SP2 before the memory device SPV can be employed for text processing operations. A control unit AE is provided for such purpose, which control unit can be activated by means of a key T1a adapted to be hand actuated. By means of the control unit AE, the memory device SPV is initially programmed to perform a number of functions. In a first switching stage the unit is operable to render activate the data memory DS in the memory device SPV. In a second switching stage, control of the identification area KB in the data memory DS is initiated in conjunction with the read unit LE, and by means of a third switching stage, read-out of the identification contained in the identification area is effected.

If the read unit LE of the memory device SPV is operative in the identification area KB of the data memory DS, a change-over switch a in the output of the read unit LE, is switched over and the read unit LE, controlled by means of the memory device SPV, supplies the identification data contained in the data memory DS to the input of the memory module SP2 during the third switching stage of the control unit AE. Subsequently, the identification information is input by the operator into the memory module SP1, over the keyboard TA, and the correspondingly shifted switch T1b.

In the event of coincidence between the two identification data contents in the memory module SP1 and SP2, the connection between the typewriter and the memory device SPV is completed over the switching units b1 and b2, under the control of the comparison circuit V. If no identification data is contained in the data memory DS, then no identification value is required to be input over the keyboard and the comparison circuit completes the connection over the switching units b1 and b2.

If new identification data is to be input into the identification area KB of the data memory DS by means of the keyboard, as a precondition the comparator V must previously have completed a connection between the typewriter and the memory device SPV over the switching units b1 and b2. The connection of the keyboard TA to the printer DR is interrupted by actuation of a switch unit T2a in conjunction with the switch unit T2b, whereby the memory device SPV is operative to set the write control SE to the identification KB of the data memory DS. The new identification can now be input in the data memory DS over the keyboard TA without having a print out thereof by the printer DR. However, if an intentional print out of the identification is to be effected by means of the printer DR, a bridging switch T3 may be provided which is in parallel to the section of the switching unit T2b, to thereby bridge the open switching unit T2b and effect operation of the printer.

Following conclusion of the text processing operation, particularly upon removal of the data memory DS from the memory device SPV, the two memory modules SP1 and SP2 are erased as a result of actuation of the switch contacts.

Although I have described my invention by reference to a particular illustrative embodiment, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. In a text processing device for utilization with a text-processing typewriter having a data memory device into which information may be entered by means of the keyboard of the typewriter, and stored for subsequent operational control thereby of a data output device, such as the printer device of the typewriter;

the combination of a comparison device having switching means for selectively controlling and completing the connections between the typewriter keyboard, printer device, and memory device including a data memory having a memory area for containing identification data, a keyboard means for supplying indentification data, from such area, to the input of the comparison device, means including said switching means for supplying identification data, manually input from the keyboard, to another input of the comparison device, said comparison device in the presence of coincidence of the compared identification data, effecting actuation of said switching means for completing connection between the memory device and the text processing typewriter a control unit for said memory device for locating and evaluating data located in said identification area of said data memory, said switching means controlled by the control unit and by the read unit of said memory device as a function of the scanning position in the data memory thereof, for switching the output of said read unit over from the data output device to the comparison device upon the existence of a matching identification area in said data memory, and means for supplying data to said comparison device comprising respective memory registers which are preconnected to the comparison device, one of said memory registers receiving identification data from said data memory and the other of said memory registers receiving identification data manually input from said keyboard, and further comprising a hand actuable switching unit for further operation of the control unit for locating an identification area and for switching on or off the data output device.

2. A text processing device according to claim 1, wherein a hand actuatable bridge switch is disposed in parallel with the switching segment of said hand actuated switching unit adapted to switch off the output device.

* * * * *